Figure 1:
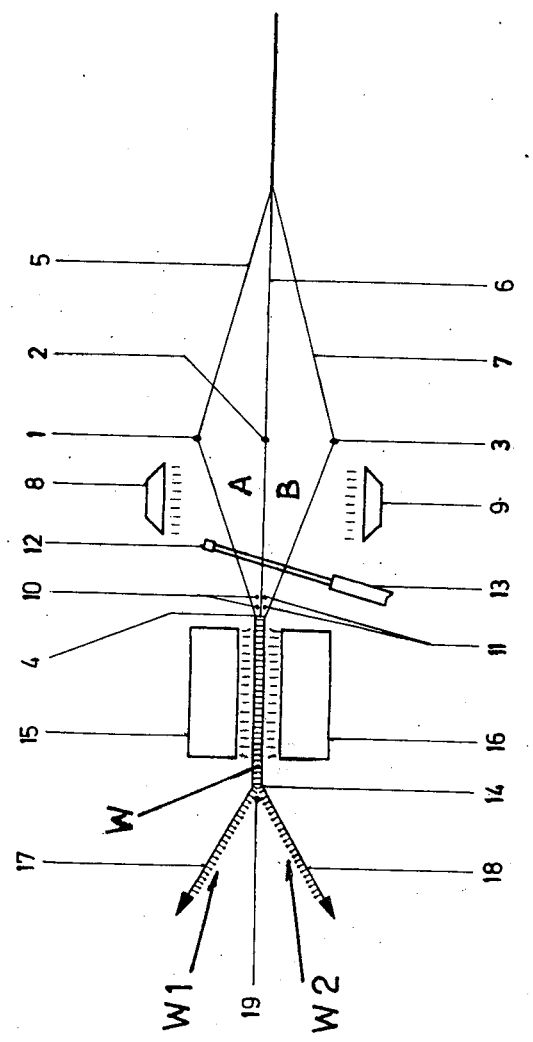

United States Patent [19]

Bühler

[11] 4,024,003
[45] May 17, 1977

[54] METHOD OF MAKING PILE FABRICS WITH DEFORMED PILE-THREAD ENDS

[75] Inventor: Hugo Bühler, Regensdorf, Switzerland

[73] Assignee: Patax Trust Reg., Schaan, Liechtenstein

[22] Filed: May 27, 1975

[21] Appl. No.: 581,167

Related U.S. Application Data

[63] Continuation-in-part of Ser. No. 415,373, March 14, 1974, abandoned.

[30] Foreign Application Priority Data

Mar. 15, 1973 Switzerland ............ 3854/73
Nov. 11, 1974 Switzerland ............ 15024/74

[52] U.S. Cl. ............ 156/148; 139/291 C; 156/254; 264/25; 264/164
[51] Int. Cl.² ............ B32B 31/00
[58] Field of Search ............ 264/167, 164 156/72, 148, 254, 435; 28/72 R, 72 P; 139/291 R, 291 C

[56] References Cited

UNITED STATES PATENTS

| 2,594,521 | 4/1952 | Tingley | 139/291 R |
| 2,680,469 | 6/1954 | Ahrer et al. | 156/148 |
| 3,087,699 | 4/1963 | Foster | 156/148 |
| 3,230,134 | 1/1966 | Studer | 264/174 |
| 3,320,649 | 5/1967 | Naimer | 28/72 P |
| 3,515,623 | 6/1970 | Bates | 139/291 C |
| 3,767,749 | 10/1973 | Chiba | 139/291 R |

FOREIGN PATENTS OR APPLICATIONS 1,045,354 12/1958 Germany ............ 139/291

Primary Examiner—Jay H. Woo
Attorney, Agent, or Firm—Michael J. Striker

[57] ABSTRACT

Two warp sheds are formed from warp threads at least some of which are meltable. The warp threads are preheated to make them deformable and weft threads are inserted into the respective sheds and beaten-up in order to form two superimposed fabrics which are connected by the meltable warp threads. During the beating-up the weft threads and the meltable warp threads are simultaneously heated so as to make them adhere to one another. The resulting fabrics are cooled to reverse the deformability of the meltable warp threads, and thereupon the latter are severed intermediate the fabrics by application of heat while the severed ends of the meltable warp threads are simultaneously deformed.

15 Claims, 13 Drawing Figures

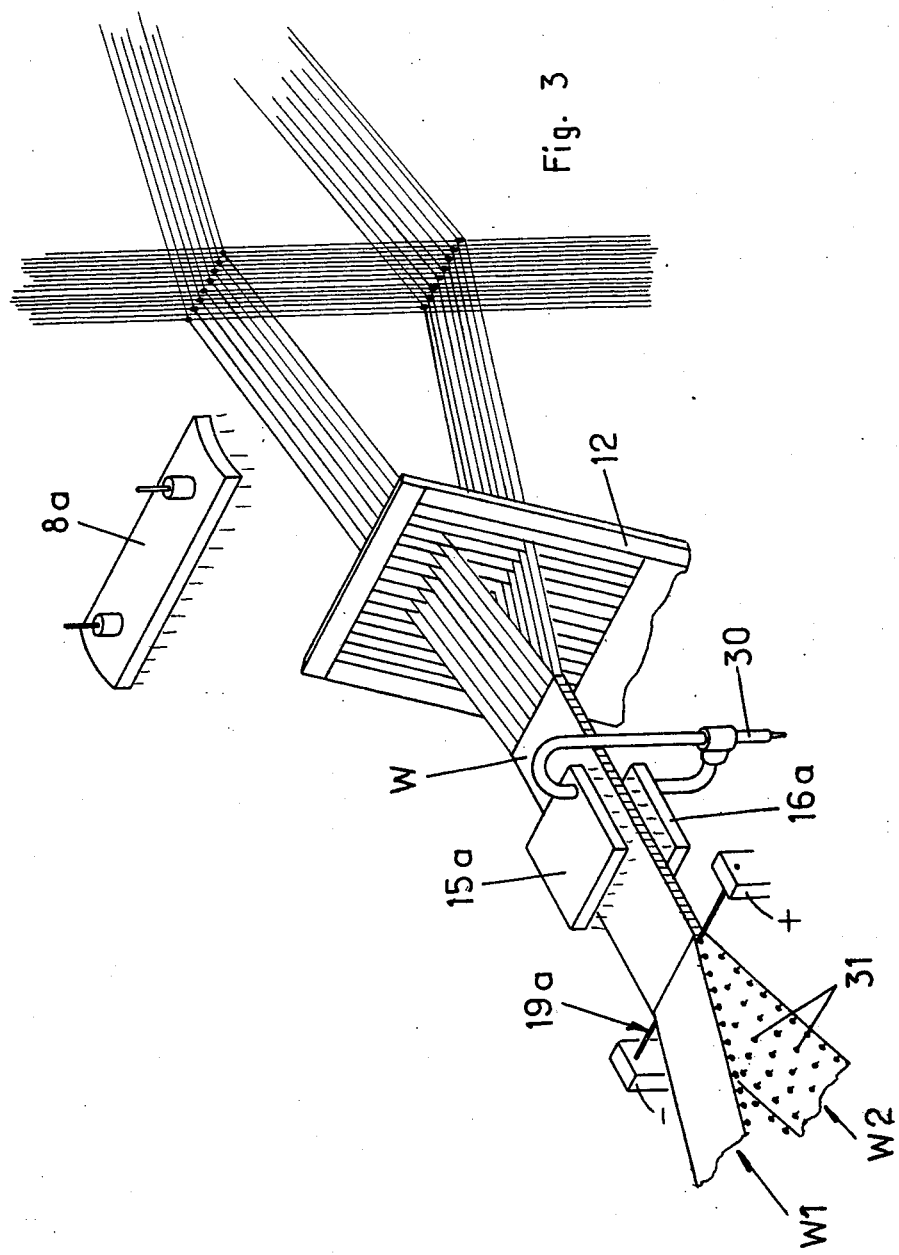

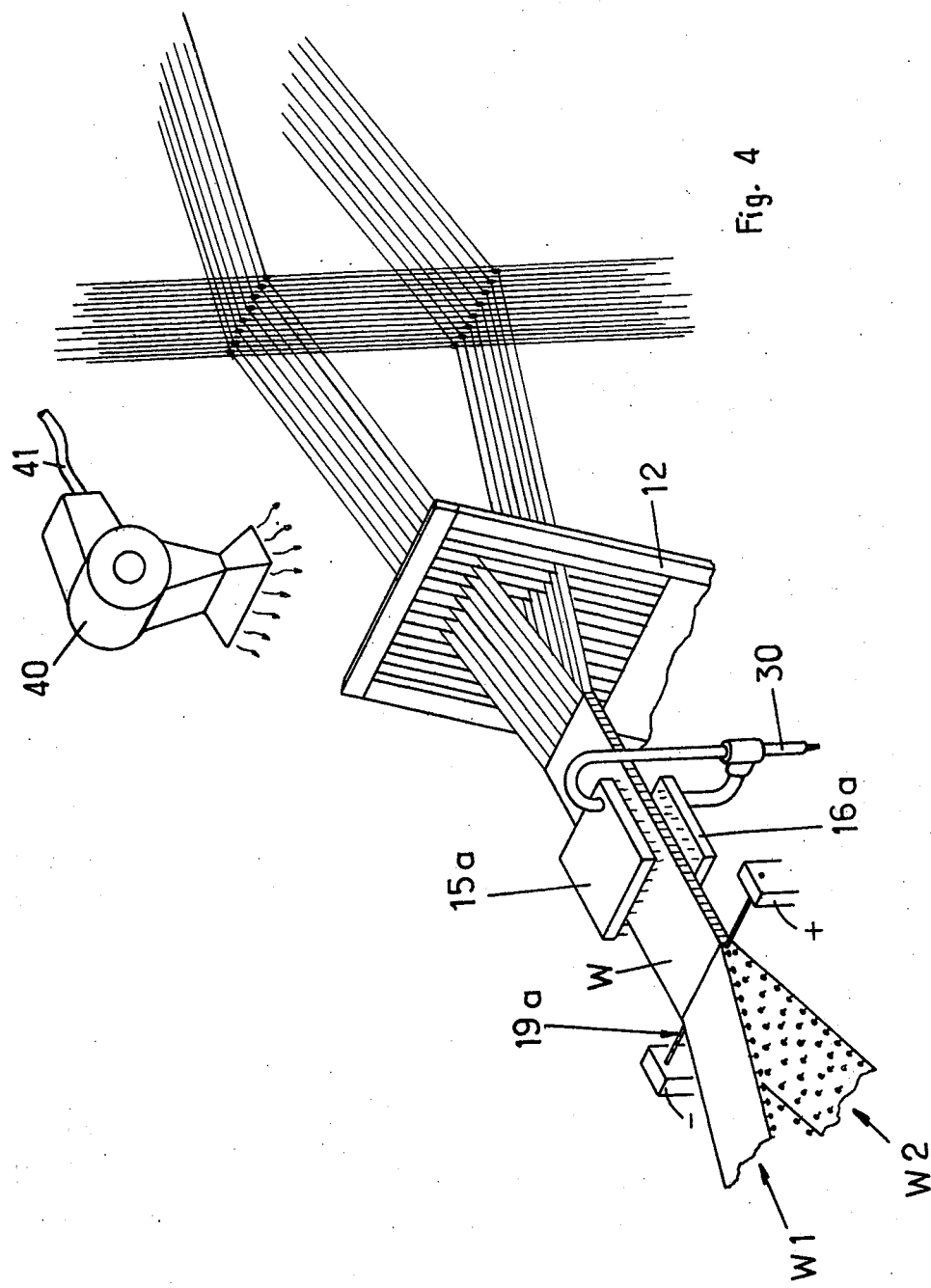

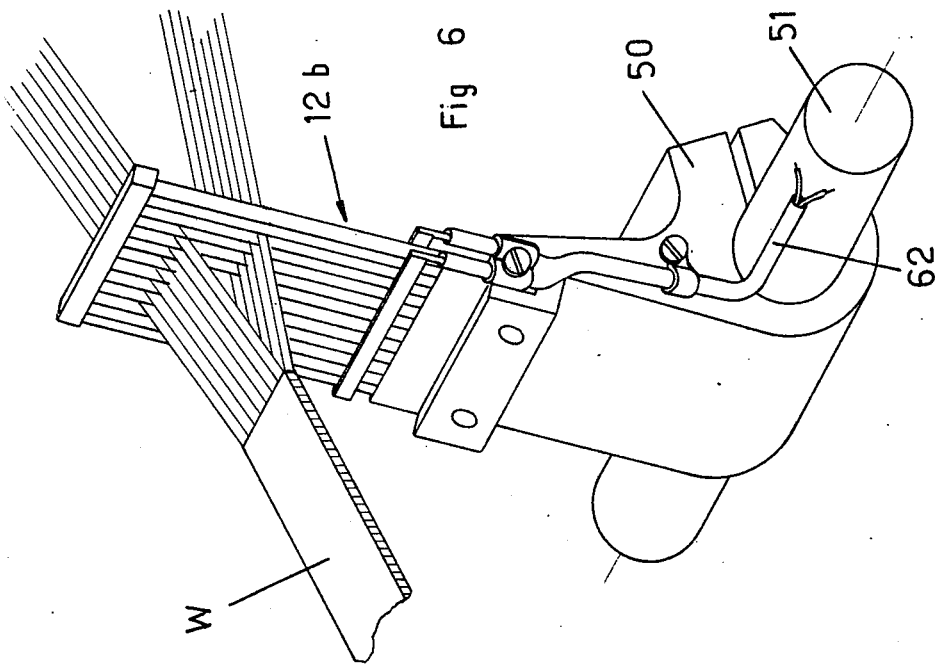
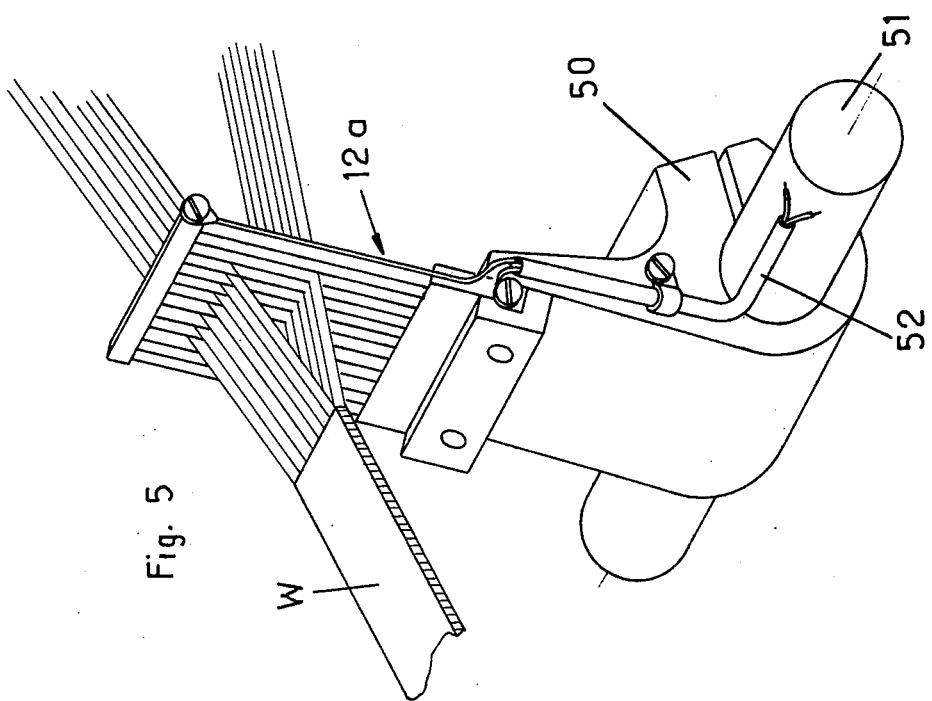

METHOD OF MAKING PILE FABRICS WITH DEFORMED PILE-THREAD ENDS

CROSS-REFERENCE TO RELATED APPLICATIONS

This is a continuation-in-part of my copending application Ser. No. 415, 373, filed Mar. 14, 1974 and now abandoned.

BACKGROUND OF THE INVENTION

It is already known to provide pile fabrics wherein the free ends of the pile threads form hooks, or are deformed to a club-shaped or mushroom-shaped configuration. These free ends can hook into or otherwise interengage with the boucle-type loops of a second fabric, to form in this manner a releasable closure when the two fabrics are pushed together. A type of closure utilizing two such fabrics is commercially available under the tradename "VELCRO".

The manufacture of pile fabrics for this purpose is quite complicated, because the different operating steps required must be carried out on different machines. One of these machines for example produces the pile fabric itself, a second machine cuts the pile threads, and a third one effects the deformation of the free ends of the pile threads.

The prior art has proposed a simplication wherein a combination of the several steps is to be effected, and these steps are to be carried out in a single machine and doing the manufacture of the fabric itself. According to this prior-art proposal, two warp sheds are to be formed, wefts are to be inserted into the warp sheds and beaten up, thus forming two superimposed pile fabrics which are thereupon heated to a sufficiently high temperature in order to fix the meltable threads which form a part of the fabric, in a vertical orientation relative to the fabrics and to anchor them therein. Thereupon the two fabrics are to be severed by severing the meltable threads connecting them and the free ends of the thus severed threads are to be deformed under the influence of heat. The separate fabrics, each provided with threads having deformed end portions, are then to be separately withdrawn.

It has been found, however, that even this proposal still has certain disadvantages which require to be rectified. In particular, the meltable threads are fixed only after the weaving operation is completed, i.e. after the weft threads are inserted and beaten up. Since the meltable threads of synthetic plastic material are relatively stiff, this caused difficulties in the formation of the fabrics, i.e. in the proper beating-up of the weft threads. Since thereupon the two major surfaces of the juxtaposed fabrics (thus far still connected) had to be heated, and since the penetration of heat was not adequate to the meltable threads, this did not cause proper bonding and fixing of the multiple threads to the other threads of the fabrics and thus assure their orientation and anchoring in the fabrics, a difficulty which could not be overcome.

SUMMARY OF THE INVENTION

Accordingly, it is an object of this invention to overcome the disadvantages of the prior art. More particularly, it is an object of the present invention to provide an improved method of making pile fabrics with deformed pilethread ends, which is not possessed of the aforementioned disadvantages.

In keeping with these objects, and with others which will become apparent hereafter, one feature of the invention resides in a method of making pile fabrics with deformed pile-thread ends. Briefly stated, this method comprises the steps of forming two warp sheds from a plurality of warp threads of which at least some are meltable. The warp threads are preheated to make them deformable and weft threads are then inserted into the respective sheds. The inserted weft threads are beaten-up to form two superimposed fabrics which are connected by the meltable warp threads, and simultaneously the meltable warp threads are heated so as to cause them to adhere to the weft threads and to be fixed in position. The resulting fabrics are thereupon cooled to reverse the deformability of the meltable warp threads, and the meltable warp threads are severed intermediate the fabrics by application of heat while the severed ends of the meltable warp threads are simultaneously deformed to the desired configuration.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic side view of a machine for carrying out the present method;

FIG. 2 is a somewhat simplified perspective view, illustrating a weaving machine incorporating the invention;

FIG. 3 is a fragmentary enlarged-scale view, showing details of one embodiment of the heating and cooling arrangement;

FIG. 4 is similar to FIG. 3, but showing a somewhat different embodiment;

FIG. 5 is a further enlarged-scale detail view, showing one manner of heating the reed of the apparatus in the preceding Figures;

FIG. 6 is similar to FIG. 5, showing another manner of heating the reed;

FIG. 7 is an enlarged-scale detail view showing one manner of cooling the superimposed fabrics;

FIG. 8 is a detail view showing a modification of the cooling arrangement in FIG. 7;

FIG. 9 is a fragmentary detail view showing one manner of severing the two superimposed fabrics;

FIG. 10 is a view similar to FIG. 9, showing another manner of severing the superimposed fabrics;

FIG. 11 is a view similar to FIG. 10, showing still a further manner of severing superimposed fabrics;

FIG. 12 is a diagrammatic enlarged-scale detail view, showing a diagrammatic longitudinal section through a portion of a superimposed-fabric web in process of being severed; and FIG. 13 shows in several stages details of how separation proceeds.

DESCRIPTION OF THE PREFERRED EMBODIMENTS

Describing firstly FIG. 1, which shows the method of the present invention being carried out, in a diagrammatic illustration, it will be seen that two warp sheds A and B are formed in known manner by operation of the heddles 1, 2 and 3 which are controlled by an appropriate shed-forming device, for example a shaft machine or a Jacquard machine. This is known per se in the art. Arranged intermediate the heddles 1, 2 and 3 and the beating-up edge 4 where the inserted weft threads are beaten up to form the fabric, are heating devices 8 and 9 that are located above and below the sheds A and B and which serve to heat and thus enhance the deformability of the meltable synthetic plastic pile warp threads, which are usually monofilaments.

Immediately ahead of the beating-up edge 4 the double wefts 10, 11 are inserted into the two sheds A and B, and each of the double wefts can also be composed of multiple-thread material. The beating-up of the inserted wefts 10, 11 against the edge 4 is effected by means of a heated reed 12 which may be heated per se or which may have its mounting structure 13 heated, as will be described subsequently. The temperature to which the reed 12 is heated is advantageously so high that when it beats up the wefts 10, 11 it will effect a fusing or adhering of the synthetic plastic pile warp threads 5, 7 with the wefts 10, 11 and/or the base warp thread 6. It is evident that a specific temperature cannot be given since this will depend upon the particular type of synthetic plastic material used of which, of course, all well known thermoplastic textile threads can be employed.

To obtain a rapid reversal of the deformability imparted to the synthetic plastic warp threads 5, 7 by the heaters 8 and 9 and by the heated reed 12, cooling devices 15, 16 are located downstream of the beating-up edge 4, between the same and the point where the heating element 19 serves to separate the two fabrics of the web W into the separate webs W1 and W2. The cooling devices 15, 16 may be in form of nozzles through which cool air is blown upon outer surfaces 17, 18 of the webs W1 and W2, respectively, so that there is no physical contact with the web W during the cooling, or there may be gliding or rolling contact with the web W, as will be explained later.

At the position 14, the severing device 19 severs the web W midway between the outer sides 17, 18 to form the separate webs W1 and W2. Advantageously, the device 19 is in form of a resistance-heated wire extending transversely of the direction of advancement of the web W and serving to sever the synthetic to sever the synthetic plastic warp threads 5, 7 and at the same time to form their free ends to the desired configuration, i.e., to form heads on them having a mushroomshaped configuration, a club-shaped configuration or the like.

The webs W1 and W2 are, of course, drawn off in the usual manner known per se in the art, e.g., by means of needle rollers or the like.

Figure 2:
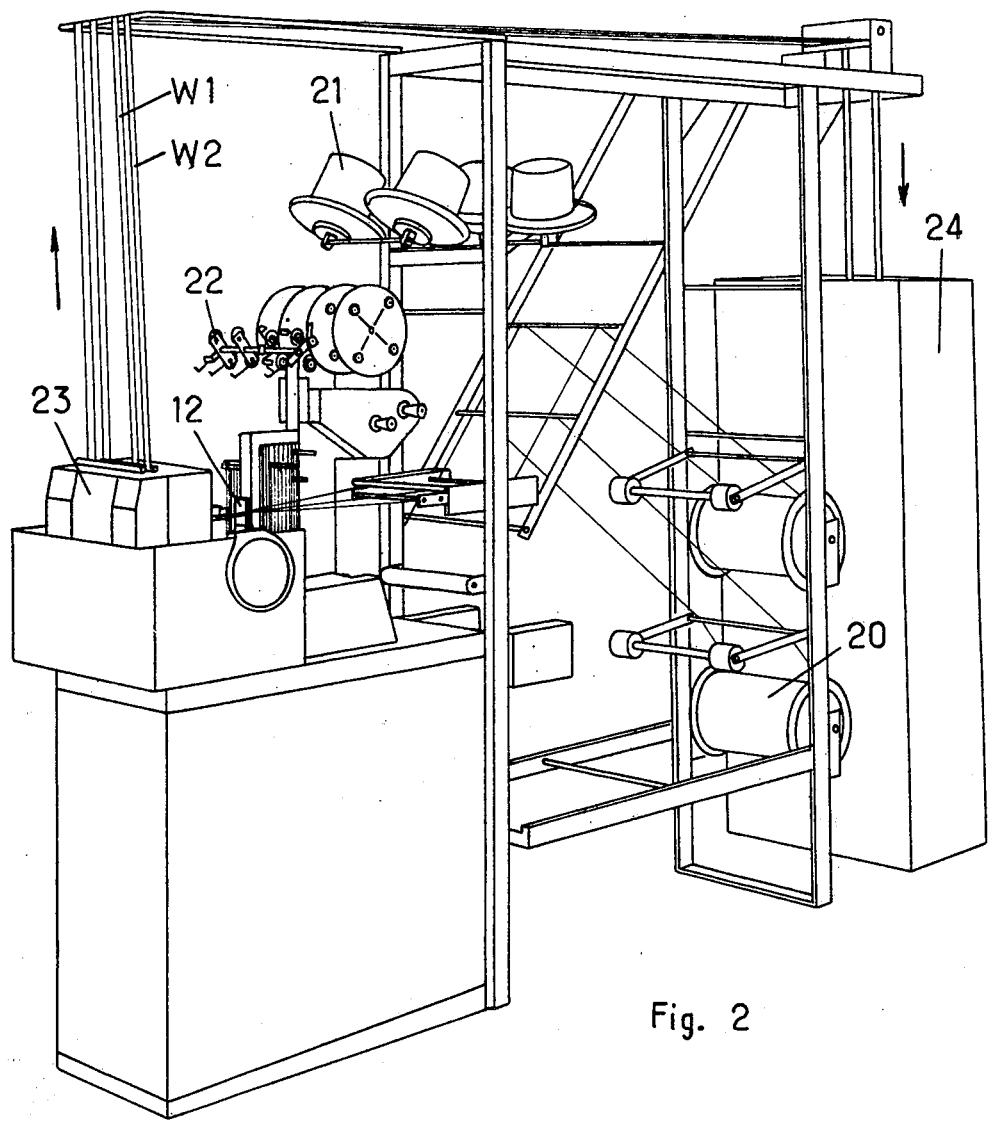

FIG. 2 shows diagrammatically a machine which is capable of carrying out the method of the invention. No particular details have been described because inherently these details concerning such machines are known in the art, except of course, for the specific details of the present invention which will be described with reference to the Figures following FIG. 2 and which have already been touched upon in the description of FIG. 1.

The weaving machine of FIG. 2 has bobbin 20 from which the warp threads are supplied, and bobbins 21 from which the weft threads are supplied. Reference numeral 22 identifies the thread tensioning devices of the machine and reference numeral 12 identifies the reed that beats up the wefts 10 and 11 (see FIG. 1) to form with the warp threads the web W. No details have been shown concerning the heating and cooling means, in order to avoid making the illustration in FIG. 2 too cumbersome. The cooling means, together with the pull-off for the web W, will be located in the housing 23 from which the severed webs W1 and W2 travel to a web receptacle 24 in the direction indicated by the arrows.

The invention will be incorporated in a machine such as the one shown in FIG. 2.

FIG. 3 shows fragmentarily an embodiment of the invention wherein the heating of the warp threads ahead of the reed 12 is effected by infrared heaters 8a which are known per se in the art. Only one of these is shown, namely the one above the sheds. The cooling in this embodiment is effected by means of plates 15a, 16a that are located above and below the web W and are provided with apertures (not shown) facing the web W through which cooling air is directed against the web surface. The cooling air is supplied via a cooling air supply line 30 whose two branches communicate with the blades 15a and 16a, respectively, it being understood that the plates themselves are hollow.

Downstream of the plates 15a, 16a there is provided the device which severs the web W into the two webs W1 and W2 each of which has upstanding pile threads provided with deformed heads 31. In FIG. 3 this device is in form of a resistance-heated wire 19a which melts the synthetic plastic warp threads as the web W travels against the wire 19a, i.e., towards the left in FIG. 3. The connection of the wire 19a to a source of electrical energy is indicated by the plus and minus symbols. The embodiment in FIG. 4 is identical in all respects with that of FIG. 3, except that the infrared heater 8a is replaced by an air blower 40 which receives air through a conduit 41 from a source (not illustrated), and blows it against the warp threads. The device 40 will have a blower incorporated in it; it may also have a heater provided in it to heat the air, unless the air is supplied in heated condition through the conduit 41.

In both FIGS. 3 and 4, the reed 12 may itself be heated by incorporation of a heating device, or it may be heated by heat radiated onto it from the devices 8a or 40, respectively.

FIG. 5 shows an embodiment in which a separate heating device is provided for the reed 12a. The latter is mounted on its mounting structure 50 by means of which it is secured on a shaft 51 so that the reed can swing with or relative to the shaft 51 in clockwise and counterclockwise directions. A resistance-heating arrangement 52 is provided which serves to heat the reed 12a when electrically energized.

The embodiment of FIG. 6 differs from the embodiment of FIG. 5 only in that it is provided with an induction heating device 62, rather than a resistance heating device 52.

The heating devices in FIGS. 5 and 6 may be provided either in the reed 12a or 12b per se, or else in the mounting structure thereof.

Figure 7:
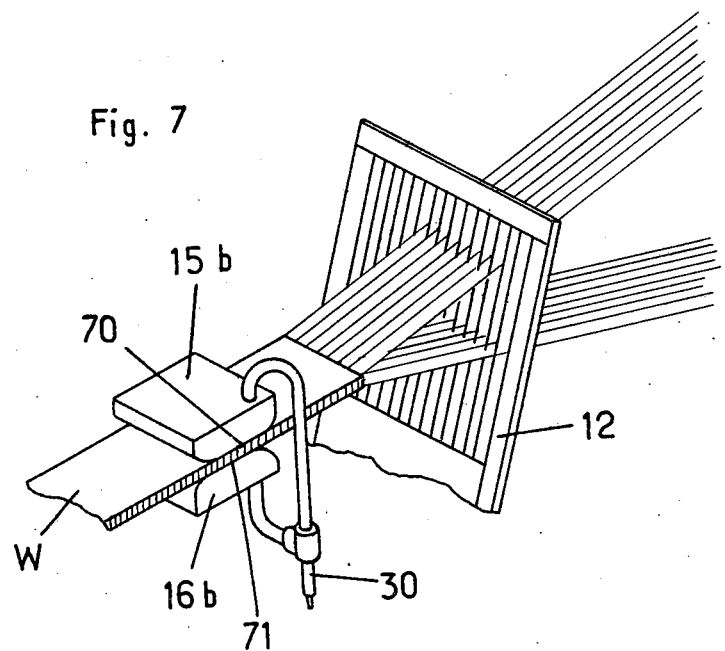

FIG. 7 shows a detail of the cooling arrangement. In this embodiment, two members 15b and 16b are provided which engage the opposite major surfaces of the web W with their glide faces 70 and 71, respectively. These glide faces may be provided with outlet openings through which cool air supplied by the pipe 30 can pass, or else cool air cooling water may be circulated through the hollow members 15b, 16b and may be removed via not illustrated outlet pipes. In that case, there would, of course, be no apertures in the faces 70 and 71, respectively. The embodiment of FIG. 7 thus provides cooling of the web W as a result of direct contact, rather than affording contact-less cooling as is described with respect to FIG. 1.

Figure 8:
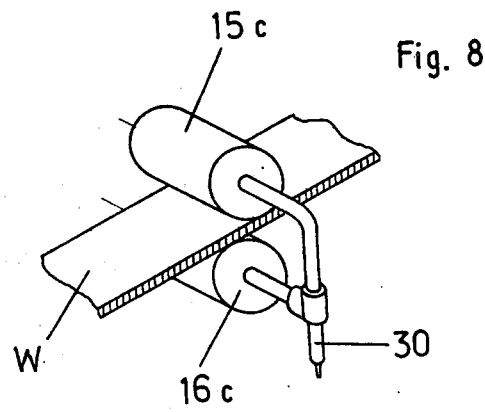

FIG. 8 shows a modification of FIG. 7, in that the members 15b and 16b are replaced with rollers 15c and 16c, respectively, through which again cool air or cooling water may be circulated by means of the pipe 30. Removal conduits for removing the spent cooling fluid may be provided, but are not illustrated. The rollers 15c and 16c, of course, have rolling contact with the major surfaces of the web W.

Figure 9:
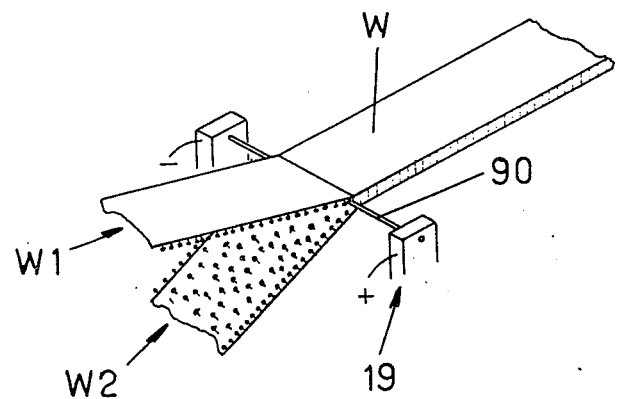

FIG. 9 shows that the heating device 19 may utilize a resistance-heating wire 90 of circular cross section for separating the web W into its separate webs W1 and W2.

Figure 10:
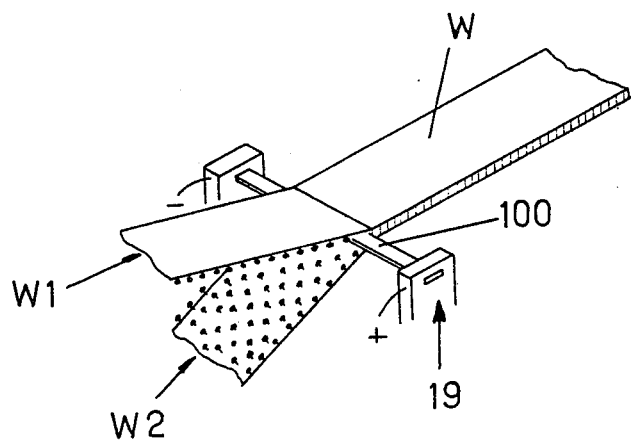

FIG. 10 differs from FIG. 9 only in that the resistance-heating wire is in form of a strip 100, rather than having a circular cross section.

Figure 11:
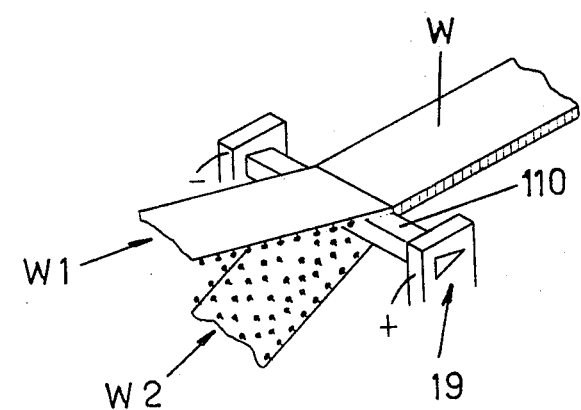

In FIG. 11, the cross section of the resistance- heating wire 110 will be seen to be substantially wedge-shaped with the sharp end of the wedge facing opposite to the direction of travel of the web W, which, of course, travels in all three FIGS. 9–11 towards the left.

Figure 12:
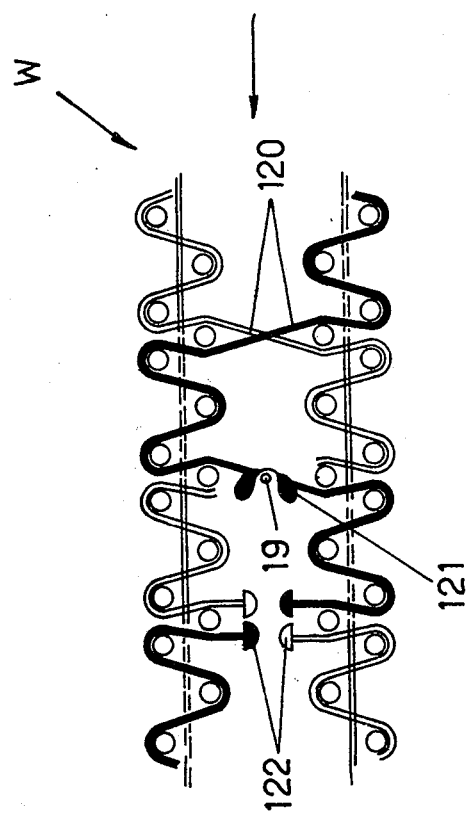

FIG. 12 shows in a very diagrammatic form the synthetic plastic warp threads 120 of the web W which travels in the direction indicated by the arrow, which threads 120 are to be served and formed with the deformed end portions or heads. It will be seen that the device 19 engages the successive warp threads 120 and melts them, whereupon first the free ends assume the configuration shown at 121 and subsequently assume the shape shown in 122. Evidently, different configurations can also be obtained.

Figure 13:
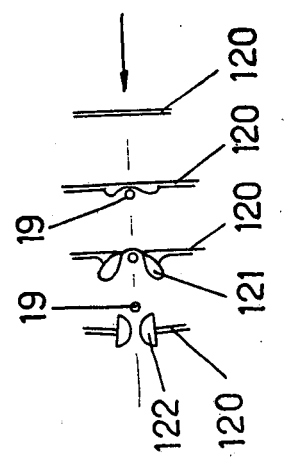

FIG. 13, finally, shows successive stages of the melting operation and formation of the deformed end portions to form the heads 122 in a very diagrammatic form. Correction of travel of the web is again indicated by an arrow, and reference numeral 120 shows a single warp thread which moves into engagement with the resistance-heated wire 19 and begins to melt and initially assume the configuration shown. During further travel of the web towards the left the as yet incomplete heads 121 form and by the time the thread 120 is completely severed by the device 19, the heads will have the shape shown at 122.

The present invention greatly facilitates the manufacture of the type of fabric in question. Moreover, by making the synthetic plastic warp threads deformable and flexible since they become heated before beating up takes place, and by anchoring them due to heating of the reed itself, the weaving speed can be significantly increased over what is known from the prior art and a product is obtained which can be produced at less expense and which is more suited than what was described in the previous proposal.

It will be understood that each of the elements described above, or two or more together, may also find a useful application in other types of fabrics differing from the type described above.

While the invention has been illustrated and described as embodied in a method of making pile fabrics with deformed pile-thread ends, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method of making separable pile-type fastening fabrics, comprising the steps of forming two warp sheds from a plurality of warp threads of which at least some are meltable; preheating the warp threads to make them deformable; inserting weft threads into the respective sheds; beating up the inserted weft threads to form two superimposed fabrics which are connected by said meltable warp threads, and during such beating up both heating and adhering the weft threads and said meltable warp threads together; cooling the resulting fabrics to reverse the deformability of said meltable warp threads; and severing said meltable warp threads in a plane intermediate said fabrics by application of heat so as to obtain two fabrics each having a pile of meltable warp threads, while at the same time also deforming the severed ends of said meltable warp threads of said two fabrics so as to form such ends with terminal enlargements.

2. A method as defined in claim 1, wherein said preheating is carried out ahead of the beating-up edge of the fabrics being produced.

3. A method as defined in claim 1, wherein the step of preheating is effected by directing heat against said warp threads from above and from below said warp sheds.

4. A method as defined in claim 1, wherein the step of preheating is effected by directing infrared radiation against said warp threads from above and from below said warp sheds.

5. A method as defined in claim 1, wherein the step of preheating is effected by directing hot air against said warp threads from above and from below said warp sheds.

6. A method as defined in claim 1, wherein the step of heating comprises induction heating a reed which effects said beating-up step.

7. A method as defined in claim 1, wherein the step of heating comprises resistance heating a reed which effects said beating-up step.

8. A method as defined in claim 1, wherein the step of heating comprises induction heating the mounting structure of a reed which effects said beating-up step.

9. A method as defined in claim 1, wherein the step of heating comprises resistance heating a reed which effects said beating-up step.

10. A method as defined in claim 1, wherein the step of heating comprises directing infrared radiation against a reed which effects said beating-up step.

11. A method as defined in claim 1, wherein the step of heating comprises directing hot air against a reed which effects said beating-up step.

12. A method as defined in claim 1, wherein the step of heating comprises heating a reed used for the beating-up step to a temperature requisite for contact of said reed with said weft threads and meltable warp threads to cause adhering to one another.

13. A method as defined in claim 1, wherein the step of cooling is carried out subsequent to the beating-up step and prior to the severing step.

14. A method as defined in claim 13, wherein the step of cooling comprises directing cooling air against said fabrics.

15. A method as defined in claim 13, wherein the step of cooling comprises engaging the fabrics in sliding relationship with cooled surfaces.

* * * * *